(12) United States Patent
Kirchhof-Falter et al.

(10) Patent No.: US 8,321,065 B2
(45) Date of Patent: Nov. 27, 2012

(54) METHOD FOR CONTROLLING/REGULATING AT LEAST ONE TASK

(75) Inventors: Guenther Kirchhof-Falter, Seeheim-Jugenheim (DE); Andreas Orians, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 887 days.

(21) Appl. No.: 11/992,690

(22) PCT Filed: Oct. 4, 2006

(86) PCT No.: PCT/EP2006/067051
§ 371 (c)(1),
(2), (4) Date: Mar. 26, 2009

(87) PCT Pub. No.: WO2007/042442
PCT Pub. Date: Apr. 19, 2007

(65) Prior Publication Data
US 2009/0198389 A1 Aug. 6, 2009

(30) Foreign Application Priority Data
Oct. 7, 2005 (DE) .......................... 10 2005 048 037

(51) Int. Cl.
*G06F 7/22* (2006.01)
(52) U.S. Cl. .......................................................... 701/1

(58) Field of Classification Search ................ 701/1, 36; 717/127–131; 718/107
See application file for complete search history.

(56) References Cited

U.S. PATENT DOCUMENTS

| | | | |
|---|---|---|---|
| 6,263,487 B1 * | 7/2001 | Stripf et al. | 717/171 |
| 7,146,470 B2 * | 12/2006 | Heinemann | 711/151 |
| 7,398,369 B2 * | 7/2008 | Dickenson | 711/170 |
| 7,779,223 B2 * | 8/2010 | Dickenson | 711/170 |
| 2002/0120662 A1 | 8/2002 | Goiffon | |

FOREIGN PATENT DOCUMENTS

WO WO 03/005136 1/2003

OTHER PUBLICATIONS

International Search Report, PCT International Patent Application No. PCT/EP2006/067051, dated Feb. 14, 2007.
Welling A et al.: "Cost enforcement and deadline monitoring in real-time specification for Java" Object-Oriented Real-Time Distributed Computing, 2004, Proceedings. 7th IEEE International Symposium on Vienna, Austria, May 12-14, 2004, Piscataway, NJ, USA, IEEE, May 12, 2004, pp. 78-85XPO10707226.

* cited by examiner

*Primary Examiner* — Joseph Rocca
*Assistant Examiner* — Nicole Verley
(74) *Attorney, Agent, or Firm* — Kenyon & Kenyon LLP

(57) ABSTRACT

A method is provided for the control/regulation of at least one task with the aid of a control program that monitors a runtime of the at least one task, the control program terminating the at least one task if the runtime of the at least one task exceeds a predefined period of time.

28 Claims, 4 Drawing Sheets

METHOD FOR CONTROLLING/REGULATING AT LEAST ONE TASK

FIELD OF THE INVENTION

The present invention relates to a method for controlling/regulating at least one task, a corresponding processing unit, a corresponding motor vehicle, a corresponding computer program, and a corresponding computer program product.

BACKGROUND INFORMATION

In every periodically running system, program sections (processes, tasks) are executed cycle by cycle, in succession. In programs having an OSEK operating system (operating system that is used primarily in microcontroller systems), for example, a monolithic kernel made up of the operating system and application is generated. The application is subdivided into multiple tasks. These have a priority, and their status may be either cooperative or preemptive. According to priority, preemptive tasks may actively interrupt lower tasks at any point. Interrupted tasks continue their processing after the execution of the preemptive task has terminated. Cooperative tasks are not able to interrupt other tasks. They begin once a task has run. The waiting task having the highest priority starts. The temporal end of a task is thus reached at different rates after its activation, as a function of its priority.

One or multiple processes are defined in one task. A process is a sequence of instructions that, depending on the scheduling strategy, may be interrupted (by preemptive tasks) or not (by cooperative tasks). All processes of a task are executed sequentially.

If the totaled runtime of the tasks is greater than the cycle duration (system cycle duration), this is referred to as overrun. The time provided was thus not sufficient to execute all tasks. When designing the software, a programmer should ensure that such a case is not able to occur. In practice, the cycle duration selected is so large that the tasks have sufficient runtime available to them. However, it is problematic if the runtime of the individual tasks is variable.

In addition to an extension of the task runtime being determined by computing time, such extension may also be caused by an unforeseen state. If the task is unable to leave this state on its own, this is called a "hang-up." An example of this is an infinite loop. A continued execution of the task is then no longer possible. Such a hang-up disturbs not only the running of the task, but in certain instances also the entire program run. Depending on the priority of the task, this may even mean a hang-up of the program.

In the following, reference is made primarily to automobile manufacturing, without the method being limited to this application.

Panoramic view applications in motor vehicles are normally based on signal-processing software that enables the provision of information about the surroundings of the motor vehicle. Sensors, such as video, ultrasound or radar sensors, monitor the surroundings of the motor vehicle. The signals of these sensors are transmitted to a central processing unit, typically a control unit, where these signals are conditioned for applications such as parking assistance, airbag activation, ACC (adaptive cruise control, "intelligent cruise control"), etc.

The signal-processing algorithms are computer-intensive, and the processing time is directly dependent on the surroundings to be monitored. Thus, computer-intensive surroundings scenarios, temperature fluctuations, or sensor measurement malfunctions may possibly utilize the microprocessor to capacity, as a result of which other computing tasks may no longer be executed.

The general objective of a runtime monitor is to provide trapping mechanisms as a function of the processing time of the signal processing in order to be able to reliably design safety-critical systems.

Runtime monitors exist, known in software technology as "watchdog," that react to a runtime violation by restarting the system. In this context, this is typically a device or software functionality in microcontroller-controlled electric devices, which prevents a runtime violation of the software from causing a complete malfunction of the device.

This is typically achieved by the software notifying the watchdog at regular intervals that it is still functioning properly. If, as a result of an error, the execution of the program is discontinued (crash or hang-up of the program), this message is not sent. As a result, the watchdog returns the device to a defined initial state by resetting it (reset).

The device cannot be used during the time of the reset and thus is not able to process data or react to queries. This is a disadvantage in particular for safety-related applications. For example, a "precrash" application attempts to detect collisions with other objects in advance and takes appropriate measures (seat-belt tensioner, airbag, etc.) to protect possibly the life of the occupant. For this reason, it is important and desirable that systems of this type are always in working order.

Thus, the problem arises of specifying a method and a device for improving the operation of microprocessor systems.

SUMMARY

According to an example method of the present invention for controlling/regulating at least one task with the help of a control program that monitors a runtime of the at least one task, the control program terminates the at least one task when the runtime of the at least one task exceeds a predetermined period of time.

Through an internal evaluation of the signal flow, the runtime monitor presented here is able to make an intelligent decision regarding the part of the software from which computing time may be deducted in order to execute a critical instruction block. Depending on the situation, an affected part of the software may be bypassed so that, for example, an error routine may be initiated and the overall system remains functional. In the event of hard runtime violations, individual parts of the program may be terminated and reinitialized.

To ensure this, a runtime monitor has been created that detects errors occurring in the program and attempts to eliminate these. In this process, the communication, the operability of the sensors, and the proper, cyclical running of the individual tasks are monitored.

According to a preferred specific embodiment of the method according to the present invention, an effective runtime of the at least one task is monitored. The effective runtime, as explained below, is a meaningful quantity that may be used for the method. Of course, an entire runtime may also be monitored.

In the example method according to the present invention, the predetermined period of time may advantageously be determined as a function of a maximum runtime and/or minimum runtime. The minimum runtime specifies a lower limit for the expected task runtime. The maximum runtime specifies an upper limit for the expected task runtime. The use of a minimum and a maximum runtime enables the simple calculation of a time span within which the task runtime is expected. The maximum runtime may additionally be advantageously used to estimate an anticipated remaining runtime.

In the example method according to the present invention, it may be advantageous if the minimum runtime and/or the maximum runtime are determined as a function of a lower limit and/or as a function of an upper limit. In a simple way, this makes it possible to determine the above-mentioned time span in fine steps.

In a particularly preferred exemplary embodiment of the example method according to the present invention, a quality value or a quality factor is determined as a function of a probability with which the runtime of the at least one task lies between the minimum runtime and the maximum runtime around the predetermined time period. This makes it possible to use an internal measure of quality to decide whether a time span is sufficient enough to continue with critical software components. In a simpler design, it is possible to use only one of the two limits. The quality factor may then be determined, for example, as a function of whether a task runtime is less than the maximum runtime or greater than the minimum runtime or vice versa.

Expediently, in one example embodiment of the method according to the present invention, the at least one task runs in consecutive cycles having a cycle time. The method is used particularly advantageously in cyclical programs.

In the example method according to the present invention, it may be advantageous if the control program determines a free cycle time as a difference between the cycle time and the runtime of the at least one task. This means in particular the period of time during which no tasks run in a cycle.

It may be furthermore particularly advantageous if, in the method according to the present invention, the predetermined period of time is determined as a function of the free cycle time. Thus, an existing time buffer may be advantageously estimated for task runtimes, and in this way it may be ensured that a sufficient remaining runtime is provided for additional tasks.

According to a preferred specific embodiment of the method according to the present invention, an additional task is provided that may not be terminated by the control program. Thus, critical sections may be advantageously protected as is presented in detail below.

It may be advantageous if a watchdog is used for the method according to the present invention. It may be used as a control program or in addition to another control program. In accordance with the described specific embodiments, the watchdog may advantageously terminate individual tasks or also execute deeper actions, such as a system restart.

It is preferred if in the method according to the present invention, a CAN (controller area network) communication is monitored.

In the method according to the present invention, a solution list may advantageously be used. This makes it possible in a simple manner to avoid repeatedly executing identical solutions or functions.

In accordance with the present invention, an example method according to the present invention is used in a motor vehicle. In this way, in particular safety-related functions may be improved in a motor vehicle.

A processing unit according to the present invention has a computation component to execute the steps of an example method according to the present invention. In particular, it may be designed as a control unit in a motor vehicle.

A motor vehicle according to the present invention is equipped with an example processing unit according to the present invention.

A computer or microprocessor program according to the present invention contains program code to implement the example method according to the present invention when the program is executed on a computer, a microprocessor, or a corresponding processing unit, in particular the processing unit according to the present invention.

A computer program product or microprocessor program product according to the present invention contains program code that is stored on a machine-readable or computer-readable storage medium to implement a method according to the present invention when the program product is executed on a computer, a microprocessor, or on a corresponding processing unit, in particular the processing unit according to the present invention. Suitable storage media are, particularly, diskettes, hard drives, flash memories, EEPROMs, CD ROMs, and others. Downloading a program via computer networks (Internet, Intranet, etc.) and vehicle networks (body bus, infotainment bus, etc.) is also possible.

Further advantages and refinements of the present invention are yielded from the description and the accompanying figures.

It is understood that the aforementioned features and the features explained below may be used not only in the combination indicated in each instance, but also in other combinations or by themselves, without departing from the scope of the present invention.

The present invention is represented schematically in the drawing based on an exemplary embodiment and is described in detail below with reference to the figures.

DETAILED DESCRIPTION OF EXAMPLE EMBODIMENTS

Figure 1A:
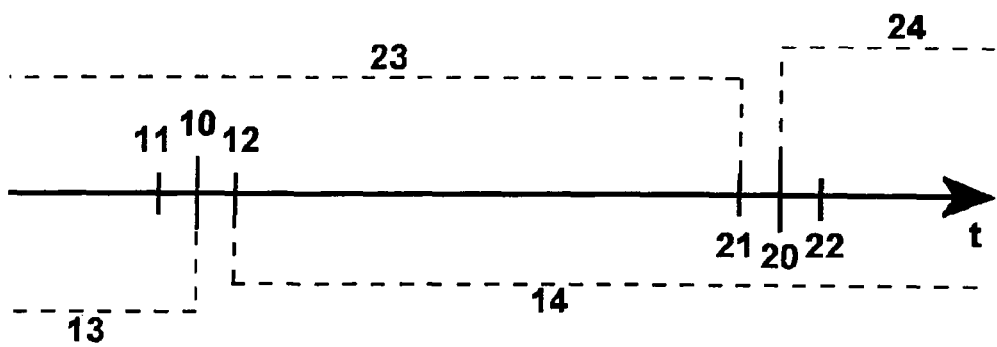
FIG. 1a depicts a schematic representation of the temporal interrelationships of a minimum and maximum runtime and of the lower and upper limits.

In the following sections, preferred specific embodiments of the method according to the present invention are described comprehensively and by way of example. In this context, general descriptions are also provided without reference to figures. It is to be understood that additionally other embodiments are also possible.

A predetermined time span, a minimum and a maximum runtime, and an upper and a lower limit may be advantageously calculated using so-called analysis functions. Thus, a time range is formed in which the runtime of the task is located with a calculable probability (quality factor).

It is possible to distinguish between an effective and a total task runtime. The effective duration of a task contains the time during which the task is in the running state (for example, "running" in an OSEK operating system). The total runtime is measured starting from the point in time at which the task was taken out of the idle state (for example, "suspended" in an OSEK operating system) and into the running state until the moment at which it returns to the idle state. Here, intermediate states are also taken into account (for example, "ready", "waiting" in an OSEK operating system).

In the specific embodiment presented, the analysis functions use the effective runtimes. Naturally, the total runtimes may be used as well.

The run of the analysis functions run is divided into two phases. During a first phase, an average value is formed over a predetermined number, for example, 100, of preceding task runtimes. The calculated average value is assigned to a minimum runtime and to a maximum runtime.

In a second phase, these runtimes are updated in each cycle. If the effective runtime is greater than the current maximum runtime, the latter is increased. The increment of the increase is advantageously attenuated, that is, the maximum runtime may be shifted by a maximum of one defined increment. Analogously, in the event that the minimum runtime is undershot, the latter is reduced incrementally and in an attenuated fashion.

The increment is advantageously fixed to the compilation time. For this purpose, it should be noted that the corresponding end value is reached more quickly through a large increment, but that abnormalities in the form of unusually long or short task runtimes have a larger influence on the result. A small increment approaches the end value slowly, the risk of an overshot being considerably smaller.

If the maximum and minimum runtime are not reached within a predetermined number of cycles, the respective limit is shifted back by one increment. This ensures that the extreme runtimes always match the current characteristics of the task. A quality value provides information regarding the accuracy of the limits. The greater the quality value, the higher the probability that the runtime of the task lies between the maximum and the minimum runtime.

The analysis functions also calculate the remaining free cycle time. This refers to the unused period of time that remains until the beginning of the next cycle after all tasks have been processed. The free cycle time is able to be calculated exactly only after all tasks have run; however, using the ascertained maximum runtimes, it is possible to predict it well.

The OSEK/VD standard provides so-called hook routines. Before the operating system (OS) puts a task into the running state, the PreTaskHook is executed. If the task leaves this state, the OS calls up the PostTaskHook. OSEK provides only one routine for each hook, that is, each task is introduced or completed respectively by the same hook routine. It is therefore necessary to check within a hook to check which task activated it.

The effective task runtime may be ascertained, for example, by measuring the time between the PreTaskHook and the PostTaskHook. The time measurement may be implemented using the timestamp function "Timestamp" (OSEK layer) and supplies then the time specification in a resolution of 1 μs.

The task runtime is saved, for example, in a global variable. At the beginning of the task, this variable must be reset to zero. The runtimes of the following task sections are subsequently added to the variable for each PostTaskHook. If the hook routine was called up through the OS instruction TerminateTask, the effective runtime of the task is reached after the addition.

To establish the task section from which the routines were called up, it is convenient to integrate into each task a start and stop marking in the form of a status bit. At the beginning of a task, a first function sets the start bit. A second function identifies the task end and is placed in front of TerminateTask. After each cycle, the status bits are deleted again by a watchdog.

Thus, the state change within the hook routines may be detected as a function of the markings, as explained in the table below.

| Hook Routine | Start Bit | Stop Bit | State Change |
| --- | --- | --- | --- |
| PreTaskHook | 0 | 0 | SUSPENDED→RUNNING |
| PostTaskHook | 1 | 0 | RUNNING→READY/WAITING |
| PreTaskHook | 1 | 0 | READY/WAITING→RUNNING |
| PostTaskHook | 1 | 1 | RUNNING→SUSPENDED |

To prevent errors, the minimum and maximum runtimes should be shifted only if no error occurred in the current cycle.

The increments determine the upper and lower limits of the extreme runtimes. The increment may be calculated as a percentage through a constant. Here it must be noted that the increment has to be greater than zero to enable a shift of the limit value.

The determination of the minimum and the maximum runtime is now explained with reference to FIGS. 1a, 1b, and 1c.

Figure 1B:
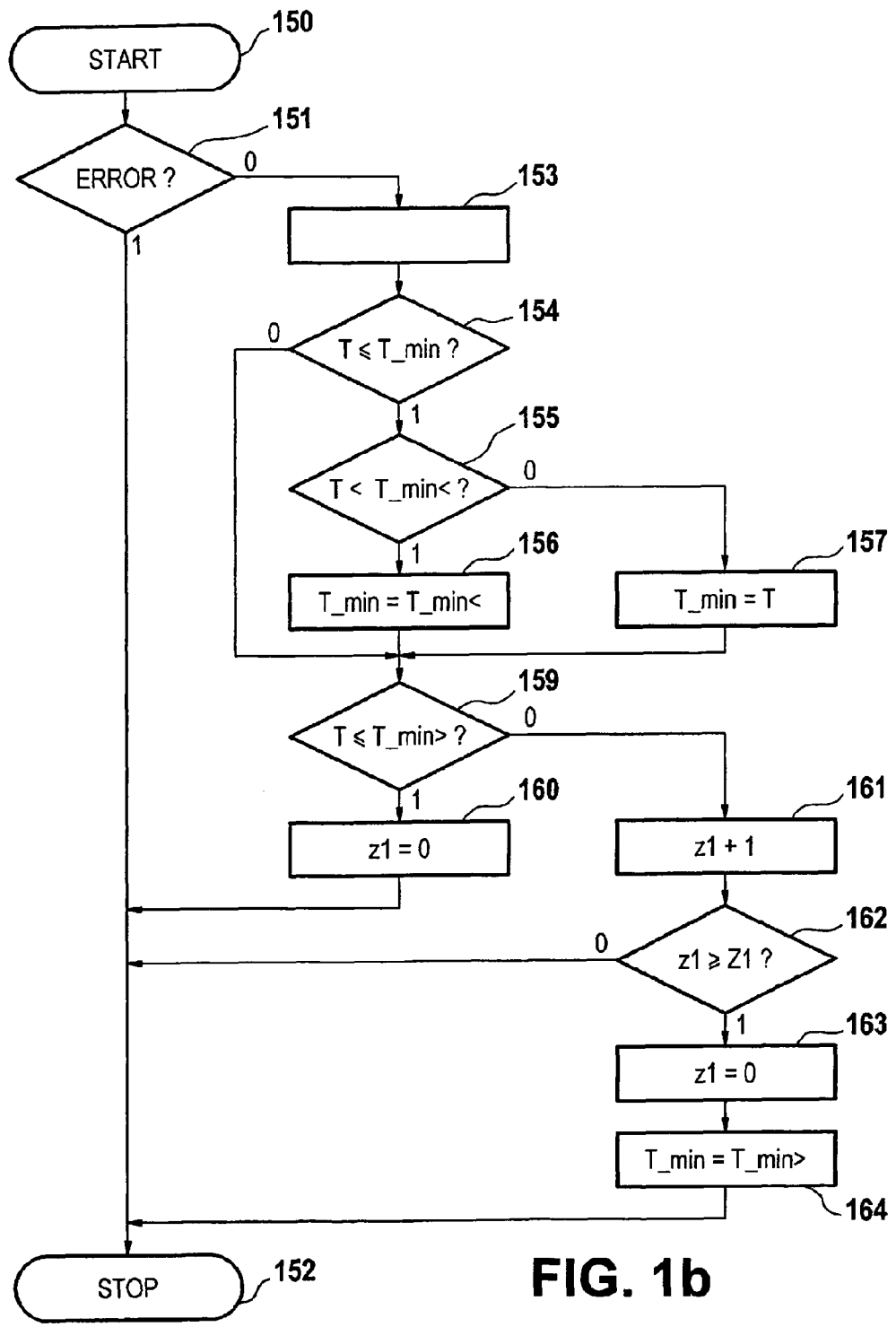
FIG. 1b depicts a flow chart of a preferred specific embodiment of the method according to the present invention for determining the minimum runtime.
Figure 1C:
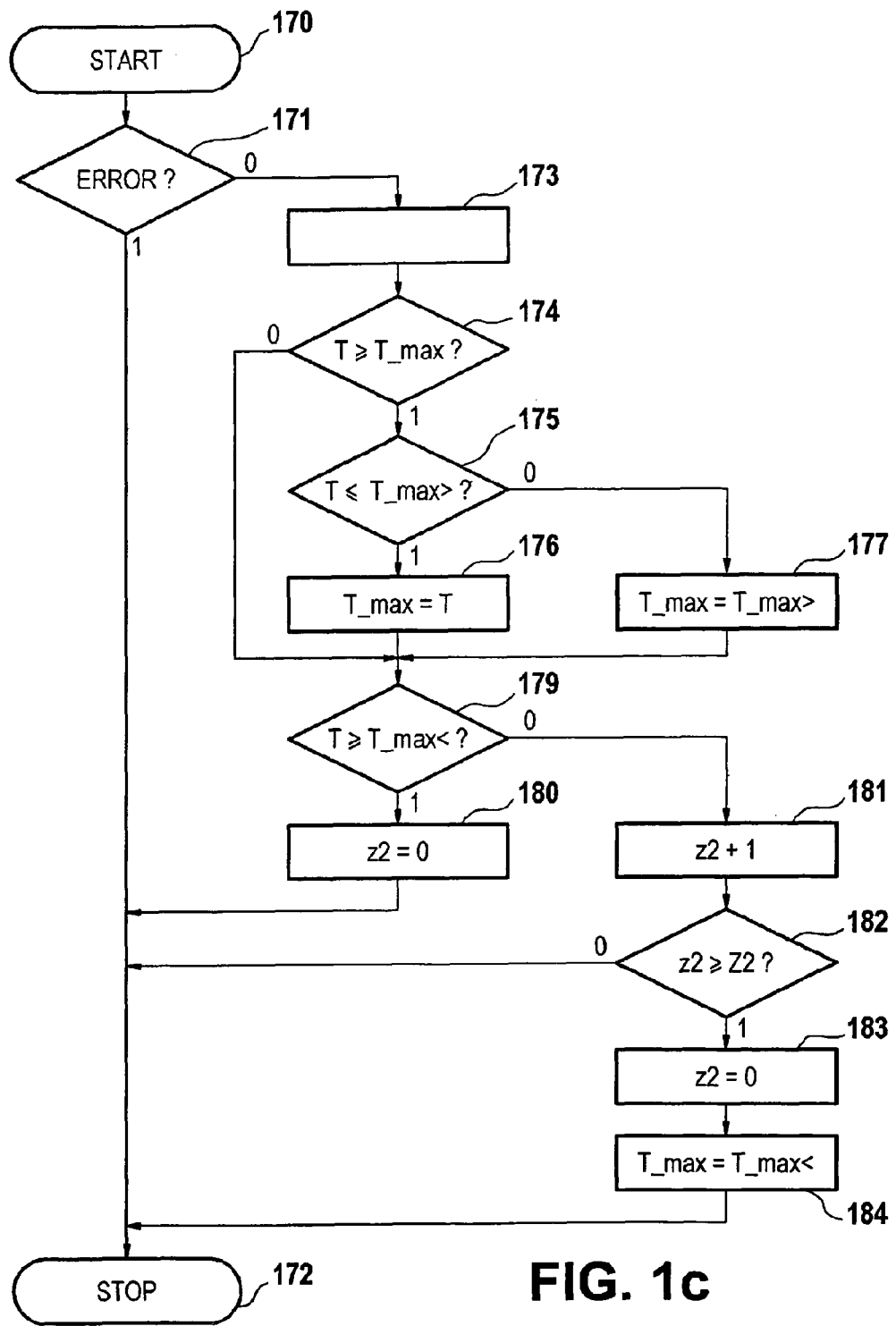
FIG. 1c depicts a flow chart of a preferred specific embodiment of the method according to the present invention for determining the maximum runtime.

The method starts in FIG. 1b in a step 150. In a step 151, a check is done to see whether an error occurred (ERROR?). If an error occurred, the method is terminated in a step 152. If no error occurred, the method branches to a step 153.

In step 153, the relevant upper and lower limits T_min> and T_min<, respectively, are calculated for the minimum runtime T_min. This occurs with the aid of the increment mentioned above. Afterwards, in step 154, the task runtime T is compared to the minimum runtime T_min. If the task runtime T is less than or equal to the minimum runtime T_min, the method continues with step 155. Otherwise, the method branches to a step 159.

In method step 155, the task runtime T is compared to the lower limit T_min<. If task runtime T is less than the lower limit T_min<, the method continues with step 156. Otherwise, the method branches to step 157.

In step 156, the minimum runtime T_min is set to be equal to the lower limit T_min<. In step 157, the minimum runtime T_min is set to be equal to the task runtime T. In both cases, the method subsequently branches to step 159.

In step 159, the task runtime T is compared to the upper limit T_min>. If the task runtime T is greater than the upper limit T_min>, the method branches to step 161. If the task runtime is less than or equal to the upper limit 12, the method branches to step 160.

In step 160, a counter z1 is set to 0. After step 160, the method is terminated with step 152.

In step 161, the counter z1 is increased by 1. After step 161, the method branches to step 162.

In method step 162, the counter z1 is compared to a specifiable maximum value Z1. If the counter z1 is greater than or equal to the maximum value Z1, the method continues with step 163. However, if the counter z1 is less than the maximum value Z1, the method is terminated in step 152.

In step 163, the counter z1 is set to 0. Afterward, in a step 164, the minimum runtime T_min is set to be equal to the upper limit T_min>.

The method is subsequently terminated with step 152.

The effects of the method described may be explained with reference to FIG. 1a. In FIG. 1a, the progression of time t is plotted to the right. If the effective task runtime T is in a range 13, that is, T<T_min, the minimum runtime T_min is reduced to this time. However, the smallest value that minimum runtime T_min may assume in this context is restricted by the lower limit T_min<. If the task runtime T occurs a defined number (specifiable maximum value Z1) of times in succession in range 14, that is, T>T_min, the minimum runtime T_min is shifted in the positive axis direction toward the upper limit T_min>.

The maximum runtime calculation is implemented according to the same principle as the calculation of the minimum runtime. If the task runtime T is within a range 24, that is, T>T_max, the maximum runtime T_max is increased. Here too, the increment restricts the shifting of the maximum runtime T_max to an upper limit T_max>. A consecutive occurrence of the runtime in a range 23, that is, T<T_max<, returns the maximum runtime T_max to the lower limit T_max<. A corresponding flow chart is depicted in FIG. 1c.

The method starts in a step 170. In a step 171, a check is done to see whether an error occurred (ERROR?). If an error occurred, the method is terminated in a step 172. If no error occurred, the method branches to step 173.

In step 173, the associated upper and lower limits T_max> and T_max<, respectively, are calculated for the maximum runtime T_max. This occurs with the aid of the increment mentioned above. Afterwards, in step 174, the task runtime T is compared to the maximum runtime T_max. If the task runtime T is greater than or equal to the maximum runtime T_max, the method continues with step 175. Otherwise, the method branches to a step 179.

In method step 175, the task runtime is compared to the upper limit T_max>. If the task runtime is less than or equal to the upper limit T_max>, the method continues with step 176. Otherwise, the program branches to step 177.

In step 176, the maximum runtime T_max is set to be equal to the task runtime T. In step 177, the maximum runtime T is set to be equal to the upper limit T_max>. In both cases, the method subsequently branches to step 179.

In step 159, the task runtime T is compared to the lower limit T_max<. If the task runtime T is greater than or equal to the lower limit T_max<, the method branches to step 180. If the task runtime T is less than the lower limit T_max<, the method branches to step 181.

In step 180, a counter z2 is set to 0. After step 180, the method is terminated by step 172.

In step 181, the counter z2 is increased by 1. After step 181, the method branches to step 182.

In method step 182, the counter z2 is compared to a specifiable maximum value Z2. If the counter z2 is greater than or equal to the maximum value Z2, the method continues with step 183. However, if the counter z2 is less than the maximum value Z2, the method is terminated in step 172.

In step 183, the counter z2 is set to 0. Afterward, in a step 184, the maximum runtime T_max is set to be equal to the lower limit T_max<. The method is subsequently terminated with step 172.

Figure 2:
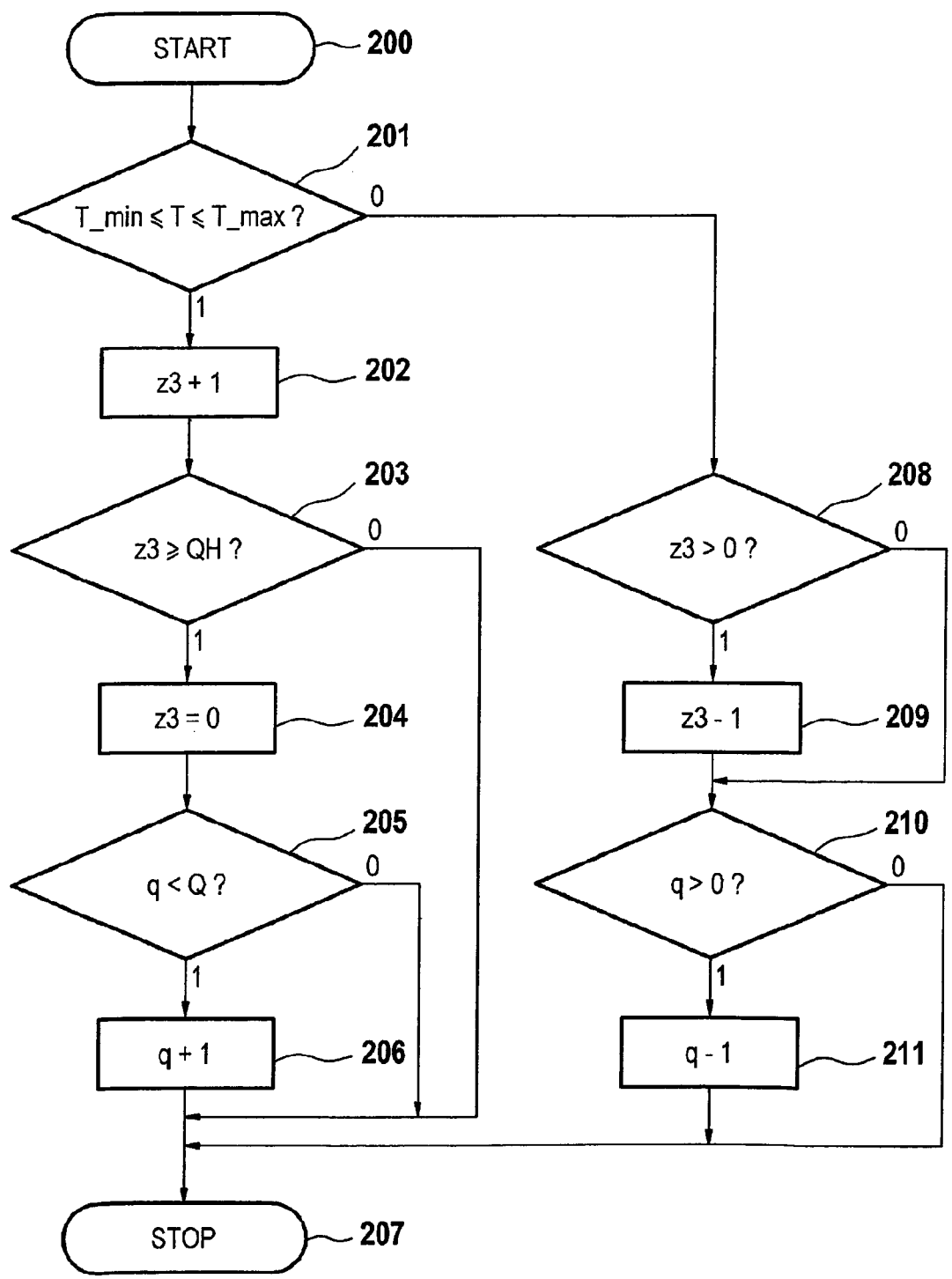
FIG. 2 depicts a flow chart of a preferred specific embodiment of the method according to the present invention for determining a quality factor.

FIG. 2 is a flow chart depicting the calculation of a quality value in accordance with one preferred specific embodiment of the method according to the present invention.

The method starts in a method step 200. In a method step 201, the effective task runtime T is compared to a minimum runtime T_min and a maximum runtime T_max. If the effective task runtime lies within the specified times, the method continues with step 202. If the effective task runtime lies outside of the time range, the program branches to method step 208.

In step 202, a counter z3 is increased by 1. Afterward, in step 203, the counter z3 is compared to a specifiable quality grade QH. If the counter z3 is greater than or equal to the quality grade QH, the method continues with step 204. Otherwise, the method branches to a step 207, with which the method is terminated.

In step 204, the counter z3 is set to 0. In a method step 205, the quality value q is subsequently compared to a specifiable maximum value Q. If the quality value q is less than the maximum value Q, the quality value is increased by 1 in a method step 206. Subsequently, the method is terminated in step 207. If the quality value is greater than the maximum value, the method is terminated immediately with step 207, after step 205.

In method step 208, a check is carried out to see whether counter z3 is greater than 0. If this is the case, counter z3 is reduced by 1 in method step 209. If this is not the case, then the method branches back to method step 210.

In method step 210, a check is carried out to see whether quality value q is greater than 0. If this is the case, quality value q is reduced by 1 in method step 211. Subsequently, the method is terminated in step 207. If this is not the case, the method is terminated in step 207, after step 210.

The quality grade QH provides information about the accuracy of the minimum and maximum runtimes. If the task runtime falls between these two limit values, counter z3 is increased. Counter z3 is set up globally for every task and thus has a memory that persists beyond the function. If this counter runs over the value of the quality grade, the quality q (quality value) is increased by one. The quality grade is specifiable for each task. It may be described as a multiplication factor of the quality. If the task runtime lies outside of the limit values, the quality is reduced by one.

In accordance with an additional preferred specific embodiment of the method according to the present invention, a remaining, free cycle time is calculated. To this end, it is necessary to know which tasks are being activated in the current cycle (enabled task). In this context, the start and stop bits provide information about the current status of the tasks.

The free cycle time may be calculated at each point in time, for example, according to the following equation:

$$T_{free} = T_{Cyc} - (T_{act} + T_{full} + T_{pre})$$

$T_{free}$: free cycle time
$T_{Cyc}$: cycle time (e.g. 20000 µs)
$T_{act}$: current timestamp
$T_{full}$: sum (maximum runtimes of not yet activated task), [start bit=0]
$T_{pre}$: sum (remaining runtimes of preempted tasks), [start bit=1, stop bit=0]

To determine the remaining runtime of the interrupted (preempted) task, the present task runtime ($T_{Left}$) is required in addition to the maximum runtime ($T_{Max}$). This is preferably saved globally in a variable. Accordingly, the remaining runtime results as follows:

$$T_{pre} = \text{Sum}(T_{Max} - T_{Left})$$

Because the free cycle time is calculated using the maximum values, $T_{free}$ is an estimated "worst case" value. Consequently, at least the calculated free cycle time remains available.

The control program (so-called guardian) is provided to provide a specific runtime to a task. If this is exceeded, it terminates the task. In this context, the objective of the control program is to ensure that sufficient remaining runtime remains available for all additional tasks to run properly.

This remaining runtime is made up of the maximum task runtime ($T_{Max}$) and the free cycle time. In this context, the free cycle time ($T_{free}$) may be understood as a buffer that the control program also takes into account. The runtime ($T_{Guard}$) provided by the control program is calculated according to the example explained:

$$T_{Guard}(\text{TASK}) = T_{Max}(\text{TASK}) + T_{free}(\text{TASK})$$

Because the maximum task runtime is an empirical value, the analysis function assigns a quality value to it. The quality clearly shows the probability with which the runtime of the task falls between the minimum and the maximum runtime. To prevent wrong decisions on the part of the guardian, in an advantageous design of the method according to the present invention, the latter may be activated only if the quality has reached a predefined value. This value may be specified for each task.

Figure 3:
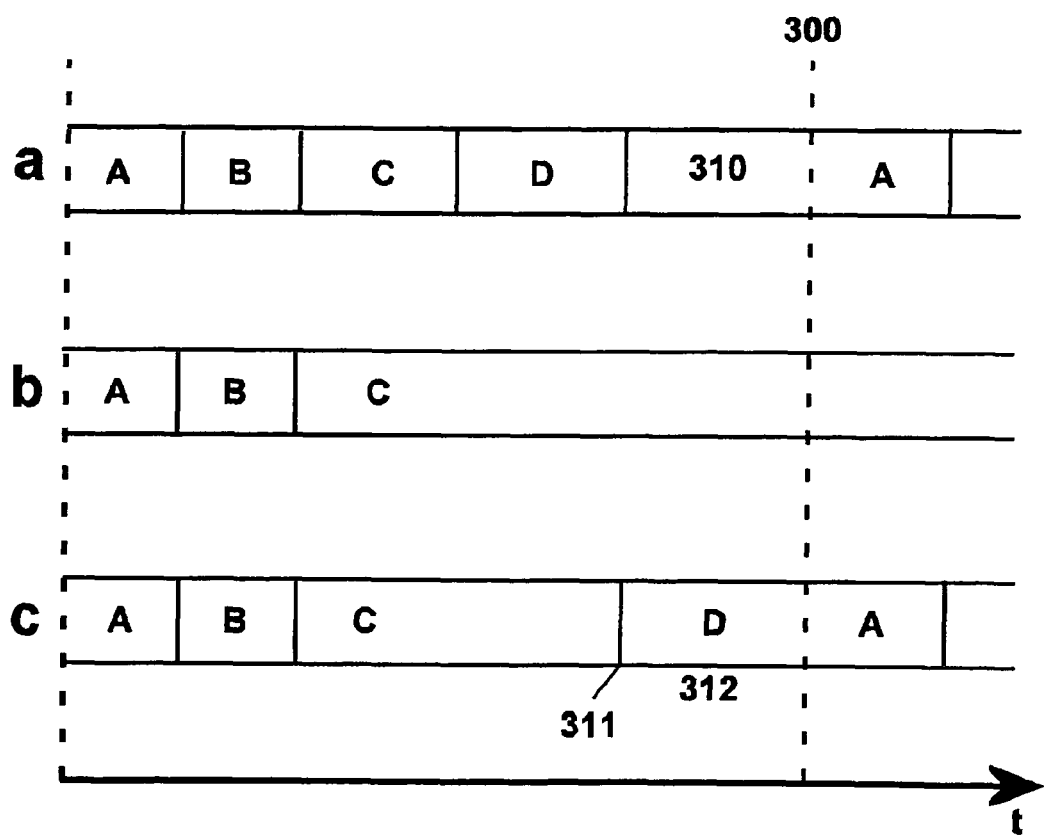
FIG. 3a depicts a schematic representation of the temporal interrelationships of a normally running task.
FIG. 3b depicts a schematic representation of the temporal interrelationships of a hung-up task.
FIG. 3c depicts a schematic representation of the temporal interrelationships of a hung-up task that is terminated by a control program in accordance with a preferred specific embodiment of the method according to the present invention.

In a periodic system, the individual tasks must be processed within the specified cycle duration. Exemplary cycles are depicted in FIG. 3. FIG. 3a shows a cycle progression in which the tasks A, B, C, and D are executed consecutively and a free, unused time 310 remains until the next cycle onset 300.

In FIG. 3b, task C has hung up and the further program run is no longer possible. The priority of task C is in this case so high that the tasks A and B are also no longer executable in a subsequent cycle.

FIG. 3c describes the same state, but with the implementation of the guardian or control program. The guardian aborts task C after the task has exceeded the predefined period of time 311. The remaining runtime 312 is sufficient for the successful execution of task D.

In an additional preferred specific embodiment of the method according to the present invention, an additional task is provided that cannot be terminated by the control program. In the following, such a task is also called a critical section. Critical ranges may be protected against abortion by the guardian. To this end, particular functions are provided, for example, that introduce and conclude a critical section. The functions are used, for example, for writing to global variables.

In addition to messages, the data exchange between tasks is implemented for larger quantities of data via global variables. For this purpose, it should be noted that this occurs in one single section and that the section is protected against interruption on the part of the guardian.

If the writing of global data is distributed to multiple ranges, the dependence of the variables on each other may be damaged by aborting the task.

The guardian is not in a position to replace the data lost by an abortion.

The following sections will now illustrate by way of example how this specific embodiment of the method according to the present invention may be implemented on a processing unit having an OSEK operating system.

A running task may be interrupted only by a task having a higher priority or by an ISR. In this context, an interruption by interrupt is advantageously selected since an interruption by alarm does not allow for an accuracy of microseconds.

It is practical to use a real-time interrupt RTI. The free-running counter has, for example, in the TMS470, two comparison registers. The CMP1 register is reserved by OSEK for the system counter. The CMP2 register is still free and may be used. Advantageously, the OSEK layer has to be supplemented only by services for using the second comparison register, since functions for the control of the RTI counter were already implemented.

Preferably, the guardian is called up in the PreTaskHook routine of the respective task. It specifies a so-called deadline (abortion point, predefined duration). If the task runs within the time provided, the guardian is once again deactivated in its PostTaskHook routine.

If a task X passes the deadline, the RTI triggers an interrupt and executes the ISR (guardian) defined in the OIL configurator. To ensure that the IRQ does not occur again, the guardian must also be deactivated in the ISR.

However, the problem arises that, for example, in OSEK/VDX a task is only able to terminate itself. Accordingly, an execution of the TerminateTask instruction within the ISR is not possible. The operating system must be in the running task X in order to be able to terminate it.

The instruction SUBS PC, LR, #4 serves as a return to the running task. A diversion is advantageously inserted in front of this instruction. Since the program is on the assembler level here, all registers that the program modifies further on in the run must be saved and later restored. The registers are preferably saved to a separate stack. For this purpose, the link register of the IRQ mode should be saved last, since this contains the return address to the running task.

The actual diversion is implemented by loading the LR(IRQ) with the address of a function Kill_Task plus an offset of four bytes. The return by the instruction SUBS PC, LR, #4 loads the content of the link register into the program counter after subtracting four bytes, and the program continues the sequence with the function Kill_Task. The return instruction also restores the saved CPSR register, and the processor thus is in the system mode.

Through this measure, the operating system or the processing unit is configured such that it seems to be in task X. The function TerminateTask may be executed thereby, and the task X terminates itself.

The function Kill_Task first determines which task currently is in the running state. Using the critical range, a check is done to see whether the task is terminated or whether the run is to be continued in TASK X. In the event of a return to the running task, the saved registers are restored.

In accordance with an additional specific embodiment of the method according to the present invention, a watchdog may be additionally provided. Like the guardian, the watchdog is also in a position to terminate a running task. Additionally, it has the option of executing a restart of the entire system. In the present example, the watchdog monitors the communication of the external CAN controllers and receives thereby information about the functionality of the sensors.

The operating system sets TASK (system), for example, periodically, every 20 ms, into the running state. Since this task has the highest priority in the system, it is started even when other tasks are still in the RUNNING state.

The option of terminating a task via the watchdog may be used as a supplement to the guardian or as an independent functionality. While the guardian acts as a prophylaxis and attempts to avoid the overrun of a task, the watchdog is responsible for tasks that have already overrun. It thus serves as a therapy for errors that have already occurred.

The watchdog is thus the ultimate entity for terminating a task. If the guardian was not able to terminate the task (protected section), the watchdog attempts to do so again. Here too, the critical section has the higher priority and a task may thus be terminated only outside of such a range.

The watchdog functions independently of the guardian and does not have to rely on the runtime investigation of the analysis functions. The overrun of a task may be monitored here by the start and stop bits and by the current task state, as shown in the following table.

| Start Bit | Stop Bit | State | Analysis |
|---|---|---|---|
| 0 | 0 | SUSPENDED | Task was not activated in cycle |
| 1 | 1 | SUSPENDED | Task was processed and terminated according to the rules |
| 1 | 0 | SUSPENDED | Task was aborted by guardian |
| 1 | 0 | READY | Task overran |

Here too the problem exists that OSEK does not provide an option to terminate a task via another task.

The watchdog is in TASK(System). This task has the highest priority and thus has precedence over any additional task. If a TASK(Forever) runs over the end of the cycle, then it is interrupted by the periodic alarm prompt of TASK(System). After termination of TASK(System), the interrupted TASK (Forever) would be returned again to the RUNNING state. The objective of this is to convey this task not into the running, but rather into the SUSPENDED state.

During the start-up of the operating system, the latter initializes all tasks with a basic configuration. In the process, a first OS function assigns to all tasks the SUSPENDED state.

An additional function resembles this first function. It deletes the transferred task from the queue of the READY task and assigns to it the state SUSPENDED.

When the scheduler is called up, it checks which tasks are in the READY state. The task having the highest priority among them is put into the running state.

Since the stack is provided to each task by a function ActivateTask, the stack pointer does not have to be reset at the end of the task.

An important component of the system is the CAN communication. The CAN serves as an interface between sensors as well as an interface of the actuators and additional control units. The communication is implemented, for example, by an external CAN controller. The watchdog also monitors this area of the system.

Different errors may occur in the CAN communication. In addition to physical interference effects on the lines, a malfunction of the CAN controller, of the bus driver, or of the sensors may impair communication or even bring it to a standstill. Each CAN controller is provided with an internal error counter that may separate it from the bus after a certain number of errors (CAN becomes highly resistive).

The software has the option of reconfiguring the CAN controller or of executing a warm reset. Such a reset reactivates a controller that is separated from the bus.

The CAN controller is equipped with so-called mailboxes. A mailbox may be configured to send or receive. Furthermore, an identifier is assigned to it as an address for identification. To send a message, the latter is stored in the send mailbox and a send bit is set. All nodes on the bus are in a position to receive the message. The successful receipt of a message is acknowledged by an acknowledgement mechanism (ACK mechanism).

The ACK slot is located within the CAN message. It is a bit field that is assigned a recessive bus level (high) by the sender. A network node confirms the error-free reception of a message by superimposing a dominant bus level (low) on this bit field. If a sender detects a dominant level within this ACK slot, it is able to detect that at least one receiver has correctly received the message.

An ACK error exists when the acknowledgement slot is occupied recessively. This case may occur when no receiver has correctly received the message, or when no additional network nodes are on the bus. As a reaction to such a detected error, the sender transfers an error frame. In a "point-to-point" transfer, the ACK mechanism may thus be used to detect malfunctions.

The successful sending of a message is signaled in the status register of the CAN controller by a transmission OK bit (TXOK). A receive OK bit (RXOK) indicates the error-free reception of a message.

In the send routine, a function waits until the TXOK bit is set. If the flag is not set within a maximum wait time, the function returns an error (error not equal to zero). Analogously, a reception routine waits for the RXOK bit, and when the wait time is exceeded, it also returns an error.

An error in the send or reception routine is documented in appropriate variables and evaluated by the watchdog. After the evaluation, the watchdog resets the flags again. The watchdog checks the error flags of the variables and where necessary takes steps to maintain the functioning of the CAN communication. For this purpose, a distinction is made between sensor CANs (CAN1-4) and CAN controllers that are connected to control units (CAN5-6). While in CAN5-6, errors are detected by the send routine, in CAN controllers that communicate with the sensors, an error occurs only if the reception routine aborted with an error. If the reception routine received data successfully, the send routine must also have run without errors, since the sensors do not send any messages without a send instruction.

In the case of an error, the watchdog first attempts to eliminate it through a renewed configuration of the CAN controller. If the error continues to exist, a warm reset (Rescue CAN Reset) of the CAN controller is implemented. If the error also occurs in the future in a sensor CAN, it may be assumed that the relevant sensor is no longer functional. In this case, the watchdog attempts to separate the defective sensor from the system in terms of the software. Because, for example, 2D tracking requires at least two sensors for triangulation, a function Rescue_CAN_Off first checks whether more than two sensors are currently active. If this is the case, it removes the relevant sensor from a Sensor_aktiv field. However, if not enough sensors are connected, a reset is executed.

If the watchdog detects an error in a CAN controller, an assigned error counter of the relevant CAN (errorCANCntg) is increased. The current number of the error counter determines whether the watchdog attempts a configuration, a reset, or the shutdown of the CAN as a solution. Appropriate limits for the compilation time may be specified for this purpose. The error counter of the CAN is set to zero after a particular number of error-free cycles.

A watching.Error_counter may be provided as an additional error counter. The global error counter of the watchdog registers all errors that occur in the system. It too is reset only after multiple error-free cycles in succession. If the counter exceeds a specified number of errors, the system is to be considered no longer operable. The watchdog then executes a restart of the system.

The restart is, for example, implemented in the hook routine ShutdownHook. The advantage is that when the operating system is shut down as a result of error, this routine is also called up, and the system starts up anew. The error handling of the operating system is thus also taken into account.

A restart is implemented through a jump to the start vector of the processor. The start vector is the address that is loaded to the program counter, for example, after a hardware reset of the TMS470.

In accordance with one additional preferred embodiment, a solution list may be provided. If the watchdog detects an error, it does not execute the solution immediately, but rather inserts it into a solution list. In the process, the solution is assigned a value as well as a transfer parameter. The solution is thus uniquely identifiable.

The advantage of using a solution list is that first all solutions are known before these are executed. This makes it possible to avoid multiple executions of the same solution, for example.

A function addSolution adds a solution to the list. In the process, it checks whether this is already contained in the list. If this is the case, it does not need to be entered into the list again. For certain solutions (CAN configuration, CAN reset) the parameter for an existing solution is supplemented. Since a configuration or a reset of multiple CAN controllers may be implemented simultaneously, only the relevant CANs are added as parameters (logical or) in the solution.

Once all error possibilities are evaluated by the watchdog, the populated solution list is processed. Before a solution is executed, an executing function execSolution checks to see whether the free time is still sufficient for processing the solution. An additional list dur_solution having the execution times of the individual solutions may be used advantageously for this purpose. This list is to be filled with the runtimes. It is to be understood that the preferred specific embodiments explained above of the method according to the present invention are to be understood only as examples. In addition to them, other design approaches are possible without leaving the framework of the present invention.

What is claimed is:

1. A method for controlling/regulating at least one task with the aid of a control program that monitors a runtime of the at least one task, the method comprising:
   initiating the at least one task;
   terminating, by the control program, the at least one task if a runtime of the at least one task exceeds a predetermined time period, wherein the predetermined time period is a function of at least one of a minimum runtime and a maximum runtime; and
   determining a quality value as a function of a probability with which the runtime of the at least one task is between the minimum runtime and the maximum runtime.

2. The method as recited in claim 1, further comprising: monitoring an effective runtime of the at least one task.

3. The method as recited in claim 1, wherein the at least one of the minimum runtime and the maximum runtime are determined as a function of at least one of a lower limit and an upper limit.

4. The method as recited in claim 1, wherein the at least one task is executed in consecutive cycles that have a cycle time.

5. The method as recited in claim 4, wherein the control program determines a free cycle time as a difference between the cycle time and the runtime of the at least one task.

6. The method as recited in claim 5, wherein the predefined time period is determined as a function of the free cycle time.

7. The method as recited in claim 1, wherein an additional task is provided that the control program is unable to terminate.

8. The method as recited in claim 1, wherein a watchdog is used.

9. The method as recited in claim 1, wherein a CAN communication is monitored.

10. The method as recited in claim 1, wherein a solution list is used.

11. A method for controlling/regulating at least one task with the aid of a control program that monitors a runtime of the at least one task, the method comprising:
    initiating the at least one task;
    terminating, by the control program, the at least one task if a runtime of the at least one task exceeds a predetermined time period; and
    determining a quality value as a function of a probability with which the runtime of the at least one task is between the minimum runtime and the maximum runtime.

12. The method as recited in claim 11, further comprising: monitoring an effective runtime of the at least one task.

13. The method as recited in claim 11, wherein at least one of a minimum runtime and a maximum runtime are determined as a function of at least one of a lower limit and an upper limit.

14. The method as recited in claim 11, wherein the at least one task is executed in consecutive cycles that have a cycle time.

15. The method as recited in claim 14, wherein the control program determines a free cycle time as a difference between the cycle time and the runtime of the at least one task.

16. The method as recited in claim 15, wherein the predefined time period is determined as a function of the free cycle time.

17. The method as recited in claim 11, wherein an additional task is provided that the control program is unable to terminate.

18. The method as recited in claim 11, wherein a watchdog is used.

19. The method as recited in claim 11, wherein a CAN communication is monitored.

20. The method as recited in claim 11, wherein a solution list is used.

21. A method for controlling/regulating at least one task in a motor vehicle with the aid of a control program that monitors a runtime of the at least one task, the method comprising:
    initiating the at least one task;
    terminating, by the control program, the at least one task in the motor vehicle if a runtime of the at least one task exceeds a predetermined time period, wherein the predetermined time period is a function of at least one of a minimum runtime and a maximum runtime; and
    determining a quality value as a function of a probability with which the runtime of the at least one task is between the minimum runtime and the maximum runtime.

22. A processing unit to control/regulate at least one task in a motor vehicle, comprising:
    a computer readable medium having a control program, which is executable by a processor, for monitoring a runtime of the at least one task, wherein the control program includes a program code arrangement having program code for performing the following:
        terminating the at least one task if a runtime of the at least one task exceeds a predetermined time period, wherein the predetermined time period is a function of at least one of a minimum runtime and a maximum runtime; and
        determining a quality value as a function of a probability with which the runtime of the at least one task is between the minimum runtime and the maximum runtime.

23. A motor vehicle, comprising:
a processing unit to control/regulate at least one task in the motor vehicle, the processing unit including a computer readable medium having a control program, which is executable by a processor, for monitoring a runtime of the at least one task, wherein the control program includes a program code arrangement having program code for performing the following:
terminating the at least one task if a runtime of the at least one task exceeds a predetermined time period, wherein the predetermined time period is a function of at least one of a minimum runtime and a maximum runtime; and
determining a quality value as a function of a probability with which the runtime of the at least one task is between the minimum runtime and the maximum runtime.

24. A computer readable medium having a microprocessor program, which is executable by a processor, comprising:
a program code arrangement having program code, including a control program, which, when executed by the microprocessor, causes the microprocessor to perform the following:
monitoring at least one task
terminating the at least one task if a runtime of the at least one task exceeds a predetermined time period, wherein the predetermined time period is a function of at least one of a minimum runtime and a maximum runtime; and
determining a quality value as a function of a probability with which the runtime of the at least one task is between the minimum runtime and the maximum runtime.

25. A method for controlling/regulating at least one task in a motor vehicle with the aid of a control program that monitors a runtime of the at least one task, the method comprising:
initiating the at least one task;
terminating, by the control program, the at least one task in the motor vehicle if a runtime of the at least one task exceeds a predetermined time period; and
determining a quality value as a function of a probability with which the runtime of the at least one task is between the minimum runtime and the maximum runtime.

26. A processing unit to control/regulate at least one task in a motor vehicle, comprising:
a computer readable medium having a control program, which is executable by a processor, for monitoring a runtime of the at least one task, wherein the control program includes a program code arrangement having program code for performing the following:
terminating the at least one task if a runtime of the at least one task exceeds a predetermined time period; and
determining a quality value as a function of a probability with which the runtime of the at least one task is between the minimum runtime and the maximum runtime.

27. A motor vehicle, comprising:
a processing unit to control/regulate at least one task in the motor vehicle, the processing unit including a computer readable medium having a control program, which is executable by a processor, for monitoring a runtime of the at least one task, wherein the control program includes a program code arrangement having program code for performing the following:
terminating the at least one task if a runtime of the at least one task exceeds a predetermined time period; and
determining a quality value as a function of a probability with which the runtime of the at least one task is between the minimum runtime and the maximum runtime.

28. A computer readable medium having a microprocessor program, which is executable by a processor, comprising:
a program code arrangement having program code, including a control program, which, when executed by the microprocessor, causes the microprocessor to perform the following:
monitoring at least one task;
terminating the at least one task if a runtime of the at least one task exceeds a predetermined time period; and
determining a quality value as a function of a probability with which the runtime of the at least one task is between the minimum runtime and the maximum runtime.

* * * * *